United States Patent
Koste et al.

(10) Patent No.: US 8,379,217 B2
(45) Date of Patent: Feb. 19, 2013

(54) SYSTEM AND METHOD FOR OPTICAL SENSOR INTERROGATION

(75) Inventors: Glen Peter Koste, Niskayuna, NY (US); Richard Louis Frey, Delanson, NY (US); Joseph Alfred Iannotti, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 1723 days.

(21) Appl. No.: 11/277,294

(22) Filed: Mar. 23, 2006

(65) Prior Publication Data

US 2007/0223003 A1     Sep. 27, 2007

(51) Int. Cl.
*G01B 9/02*     (2006.01)
(52) U.S. Cl. ...................................................... 356/478
(58) Field of Classification Search .................. 356/454, 356/519, 478, 35.5, 477
See application file for complete search history.

(56) References Cited

U.S. PATENT DOCUMENTS

| | | | |
|---|---|---|---|
| 4,834,111 A | | 5/1989 | Khanna et al. |
| 5,380,995 A | * | 1/1995 | Udd et al. ................ 250/227.18 |
| 5,564,832 A | * | 10/1996 | Ball et al. ...................... 374/161 |
| 5,838,437 A | * | 11/1998 | Miller et al. ................... 356/478 |
| 5,844,927 A | * | 12/1998 | Kringlebotn ...................... 372/6 |
| 6,097,487 A | * | 8/2000 | Kringlebotn et al. ......... 356/450 |
| 6,115,122 A | | 9/2000 | Bao et al. |
| 6,204,920 B1 | * | 3/2001 | Ellerbrock et al. ........... 356/477 |
| 6,680,472 B1 | * | 1/2004 | Thingbø et al. .......... 250/227.12 |
| 2003/0142319 A1 | * | 7/2003 | Ronnekleiv et al. ......... 356/477 |
| 2005/0180470 A1 | | 8/2005 | Sadot et al. |
| 2005/0253050 A1 | | 11/2005 | Seeley et al. |
| 2005/0281560 A1 | | 12/2005 | Kern et al. |
| 2006/0181711 A1 | * | 8/2006 | Waagaard et al. ............ 356/478 |

FOREIGN PATENT DOCUMENTS

WO     WO 02/04903 A1     1/2002

OTHER PUBLICATIONS

Michael Joseph Schutten et al.; "Optically Powered Drive Circuit and Method for Controlling a Semiconductor Switch"; U.S. Appl. No. 11/273,178, filed Nov. 14, 2005.

* cited by examiner

*Primary Examiner* — Tarifur Chowdhury
*Assistant Examiner* — Jonathan Hansen
(74) *Attorney, Agent, or Firm* — Ann M. Agosti

(57) ABSTRACT

An optical sensor interrogation system comprises: a multi-frequency optical source configured to generate an optical interrogation signal, at least one optical sensor configured to filter light at a wavelength corresponding to a value of a sensed parameter and generate an optical sensor data signal, a photodetector configured to detect a reference signal and the optical sensor data signal and generate an electrical difference frequency signal corresponding to a wavelength difference between the reference signal and the optical sensor data signal, and an electrical frequency measurement module configured to measure the electrical difference frequency.

27 Claims, 10 Drawing Sheets

SYSTEM AND METHOD FOR OPTICAL SENSOR INTERROGATION

BACKGROUND

The invention relates generally to sensor interrogation and more particularly to optical sensor interrogation.

Optical sensor systems in general have benefits over electrical systems due to electromagnetic interference (EMI) immunity, higher temperature operation, and ability to multiplex many sensor signals on the same transmission fiber. In optical sensor systems, the sensed parameter can be encoded as an intensity change, a wavelength shift, or a polarization change of the optical signal. Optical sensor systems based on wavelength encoding have the advantage of immunity to loss variation in the transmission medium.

Interrogation of optical wavelength sensors is typically implemented by measuring the optical power as a function of optical wavelength, as in an optical spectrum analyzer. One method for measuring this is to sweep a tunable optical filter over the spectrum of interest and record the power at different wavelengths using a photodetector. Another method is to spread the optical signal spatially using a prism or other wavelength dependent device and illuminate an array of photodetectors. In this method, each photodetector measures the power at a specific optical wavelength.

A challenge with interrogating optical sensors based on wavelength encoding is decoding of the wavelength at the processing end of the system with high speed and accuracy. Current optical interrogation systems typically achieve 10 to 1000 Hz data decoding rates. In many applications such as in control systems and in structural health monitoring, much higher rates, as high as tens of Megahertz, are required.

It would therefore be desirable to achieve higher data decoding rates without increased cost or complexity in the interrogation systems.

BRIEF DESCRIPTION

One embodiment of the present invention is an optical sensor interrogation system including a multi-frequency optical source configured to generate an optical interrogation signal, at least one optical sensor configured to filter light at a wavelength corresponding to a value of a sensed parameter and generate an optical sensor data signal, a photodetector configured to detect a reference signal and the optical sensor data signal and generate an electrical difference frequency signal corresponding to a wavelength difference between the reference signal and the optical sensor data signal; and an electrical frequency measurement module configured to measure the electrical difference frequency.

A second embodiment of the present invention is an optical sensor-interrogation system including a laser source configured to generate an optical interrogation signal, at least one optical sensor configured to filter light at a wavelength corresponding to a value of a sensed parameter and generate an optical sensor data signal, at least one reference sensor configured to filter light at a wavelength corresponding to a value of a reference parameter and generate a reference signal, a photodetector configured to detect the reference signal and the optical sensor data signal and generate an electrical difference frequency signal corresponding to a wavelength difference between the reference signal and the optical sensor data signal, and an electrical frequency measurement module configured to measure the electrical difference frequency, wherein the electrical frequency measurement module includes a series of narrow band filters.

A third embodiment of the present invention is a method for optical sensor interrogation and measurement including interrogating at least one optical sensor via a multi-frequency interrogation signal, the at least one optical sensor configured to filter light at a wavelength corresponding to a value of a sensed parameter and generate an optical sensor data signal, detecting a reference signal and the optical sensor data signal via a single broadband photodetector, the photodetector configured to generate an electrical difference frequency signal corresponding to the wavelength difference between a reference signal and the optical sensor data signal, and measuring electrical frequency of the difference frequency signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
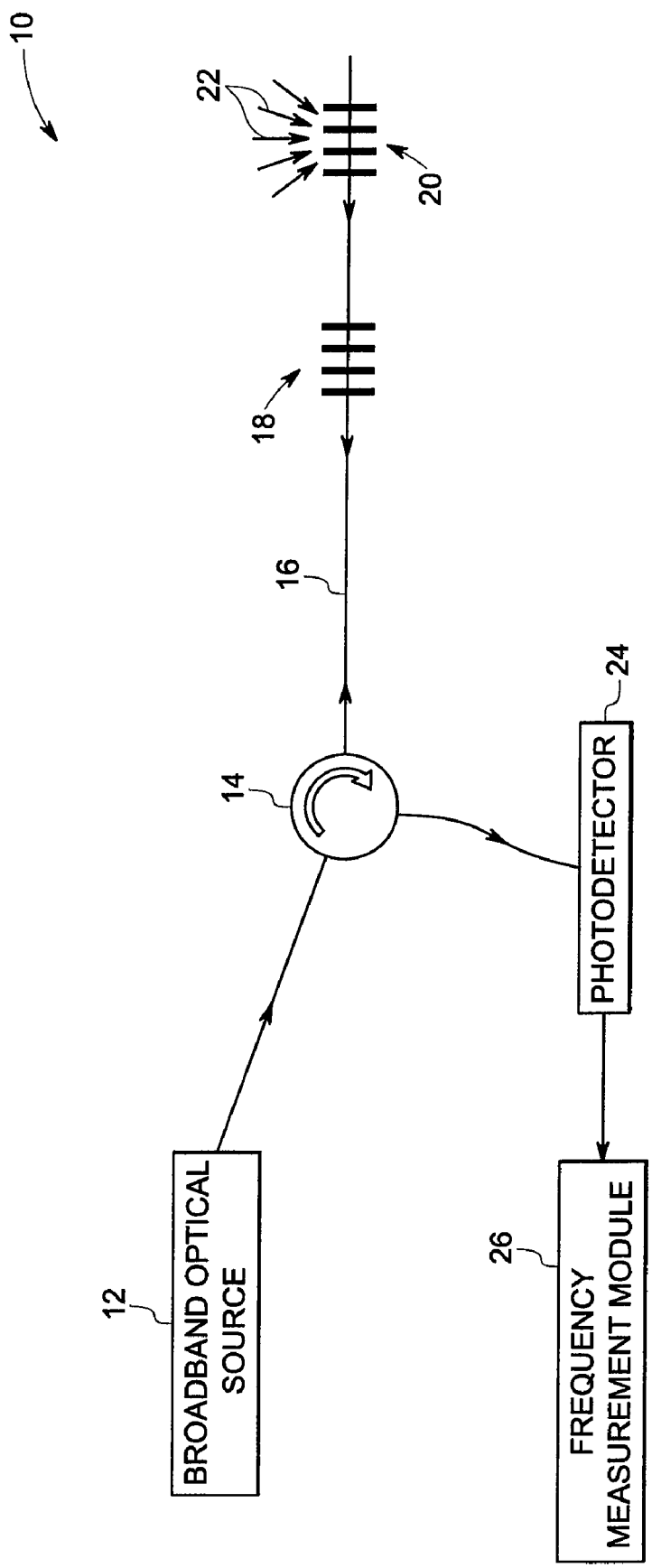
FIG. 1 is a schematic view of an optical interrogation system in accordance with one embodiment of the present invention.

Embodiments of the present invention relate to optically interrogated sensor systems based on wavelength encoding. A sensed parameter is encoded as a frequency difference of two optical signals. The frequency difference is measured in the electrical domain using an electrical frequency measurement module. As used herein, the term "multi-frequency optical source" refers to an optical source emitting light at a plurality of wavelengths such as a broadband optical source, a Fabry-Perot laser, an external cavity laser, or an optical device including a plurality of light sources emitting at a plurality of wavelengths.

As used herein, the term "optical" refers to electromagnetic radiation in the infrared, visible and ultra violet frequency region of the electromagnetic spectrum.

As used herein, the term "optical filter" refers to an optical element or device, which preferentially reflects or transmits light at a particular wavelength.

A pair of optical wavelength signals, a reference signal $S_r$ and an optical sensor data signal $S_o$, have a wavelength difference correlating to a value of a sensed parameter. The reference frequency signal $S_r$ is given by $$S_r = E_r \cos(\omega_r t), \quad (1)$$

where $E_r$ is the amplitude of the reference signal and $\omega_r$ is the frequency of the reference signal. The optical sensor data signal $S_o$ is given by, $$S_o = E_o \cos(\omega_o t), \quad (2)$$

where $E_o$ is the amplitude of the optical sensor data signal and $\omega_o$ is the frequency of the optical sensor data signal. If the reference and sensor signals are mixed and concurrently detected by a photodetector, the resultant photodetector current I is proportional to the square of the sum of both signals and is given by:

$$I = k(S_r + S_o)^2 \quad (3)$$

where k is a constant of proportionality. Therefore, $$I = k[E_r \cos(\omega_r t) + E_o \cdot \cos(\omega_o t)]^2. \quad (4)$$

Equation (4) may be expanded as follows, $$I = kE_r^2 \cos^2(\omega_r t) + 2kE_r E_o \cos(\omega_r t)\cos(\omega_o t) + kE_r^2 \cos^2(\omega_o t). \quad (5)$$

The current I can be rewritten in terms four frequency terms, $2\omega_r$, $2\omega_o$, $(\omega_r - \omega_o)$, and $(\omega_r - \omega_o)$, as $$I = 0.5kE_r^2[1 + \cos 2(\omega_r t)] + kE_r E_o[\cos\{(\omega_r - \omega_o)t\}] + kE_r \cdot E_o[\cos\{(\omega_r + \omega_o)t\}] + 0.5kE_o^2[1 + \cos 2\omega_o t]. \quad (6)$$

Therefore, the difference frequency current term $I_d$ is given by $$I_d = kE_r E_o[\cos\{(\omega_r - \omega_o)t\}], \quad (7)$$

where $(\omega_r - \omega_o) = \omega_d$, the difference frequency.

For example, two optical signals at wavelengths 1550.5 and 1551.0 nanometers (nm) incident on a photodetector will generate a difference frequency current $I_d$ at a frequency of 62.4 Gigahertz (in the microwave frequency region). This difference frequency $\omega_d$ can be directly detected using electrical frequency measurement modules, whereas other frequency terms resulting due to the mixing of the optical signals will lie in the higher frequency regimes and are too high to be detected by known electrical frequency measurement modules.

One embodiment of the present invention is an optical sensor interrogation system including a multi-frequency optical source configured to generate an optical interrogation signal and at least one optical sensor configured to filter light at a wavelength corresponding to a value of a sensed parameter and generate an optical sensor data signal. The system further includes a photodetector configured to detect a reference signal and the optical sensor data signal with no filtering or spatial separation between the signals. In one embodiment, a reference sensor is used to generate the reference signal from the optical interrogation signal. The photodetector generates an electrical difference frequency signal corresponding to a wavelength difference between the reference signal and the optical sensor data signal. In one embodiment, the electrical frequency detection occurs through the use of a series of electrical filters, power detectors, and mixers to generate a binary representation of the frequency. In another embodiment, frequency discriminators are used to measure the frequency of the electrical difference frequency signal. As will be appreciated by one skilled in the art, many techniques are known for measuring the frequency of microwave signals. While a few representative examples of frequency measurement modules have been presented here, the scope of the invention is not limited to these specifically described examples. All present and future alternatives for measuring the frequency of microwave signals fall within the scope of the invention.

Suitable examples of multi-frequency optical sources include broadband optical sources, which emit light over a range of frequencies and Fabry-Perot and external-cavity lasers, which emit a comb of wavelengths spaced evenly apart as determined by the laser cavity length.

Examples of optical sensors for use in embodiments in the present invention include tunable optical filters, which exhibit variations in their characteristic frequency at which they reflect or transmit, under the influence of an external parameter. One non-limiting example of an optical filter is a Bragg grating, specifically a fiber Bragg grating. Typically, a fiber Bragg grating consists of refractive index modulation along a portion of a fiber with a specified period. Fiber Bragg gratings are based on the principle of Bragg reflection. When light propagates through periodically alternating regions of higher and lower refractive index, the light is partially reflected at each interface between those regions. A series of evenly spaced regions results in significant reflections at a single frequency while all other frequencies are transmitted. When a Bragg grating is used, the grating thus acts as a notch filter, which reflects light of a certain wavelength. Since the frequency, which is reflected, is dependent on the grating period, a small change in the length of the fiber can be detected as a frequency shift.

One alternative to fiber gratings, for example, is a Fabry-Perot in-fiber sensor, which reflects light strongly at several wavelengths. The pattern of reflected light is affected by the width of the Fabry-Perot cavity. Other non-limiting examples of optical sensors include filters such as but not limited to optical microresonators, which typically filter light at a particular characteristic frequency in response to an external parameter such as electric current, magnetic field, electric field, stress, strain, pressure, or temperature, which would lead to a change in the characteristic frequency. The change in the characteristic frequency typically results due to a change in the refractive index or absorptive constant of the resonator. The optical sensors may be further coupled to transducers such as piezoelectric transducers which when coupled to in-fiber sensors can lead to change in the grating period in response to variations in an applied parameter. Other non-limiting examples of optical sensors include thin film filters and acousto-optic filters.

In the illustrated embodiment shown in FIG. 1, an optical interrogation system 10 includes a broadband optical source 12, light from which is coupled through an optical circulator 14 to a fiber 16 through to an in-fiber reference sensor 18 (such as a bragg grating), and an in-fiber optical data sensor 20 (such as a bragg grating). The optical data sensor grating 20 is so positioned and configured that in response to variations in a sensed parameter 22, the characteristic reflection frequency of the grating varies. A reference wavelength component $\omega_r$ of the incident broadband light is reflected by the reference sensor to form the reference signal, and a data sensor wavelength component $\omega_o$ of the incident broadband light is reflected by the data sensor to form the sensor data signal. The signals are carried back along the same fiber 16 to the optical signal directing element 14, which separates the forward and backward propagating signals. Suitable examples of optical signal directing elements include optical circulators and directional couplers. The reference signal and the sensor data signal are coupled into a photodetector 24. Since a photodetector is a square law detector, the two optical signals mix and form sum and difference signals in the electrical domain. The electrical frequency of the difference signal directly correlates to the difference in the optical wavelengths of the reference and sensor data signals. The electrical frequency of the difference signal is low enough to be detected by an electrical frequency measurement module 26.

Figure 2:
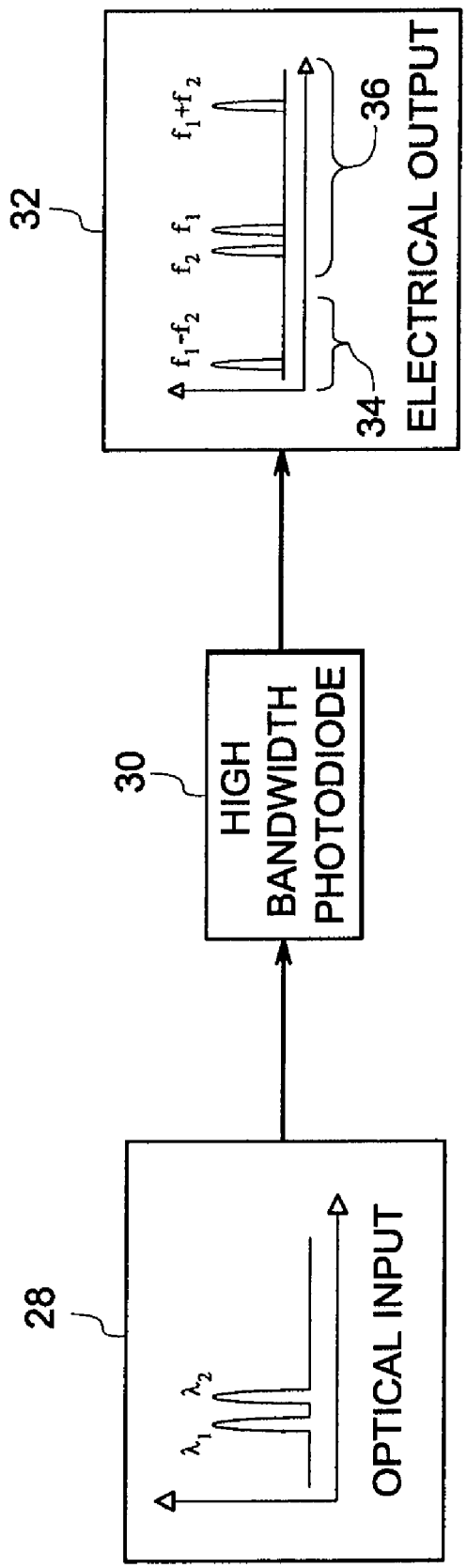
FIG. 2 is a schematic representation of optical signal to electrical difference signal conversion using a photodetector in one embodiment of the present invention.

As shown in FIG. 2, an input 28 at the photodetector 30 of an optical signal with wavelength peaks at $\lambda_1$ (frequency $f_1$) and $\lambda_2$ (frequency $f_2$) results in four electrical photodetector current 32 frequency components at frequencies $f_1$, $f_2$, $f_1-f_2$, $f_1+f_2$. The difference frequency component $f_1-f_2$ 34 falls in the microwave or lower frequency range, while the other frequencies 36 lie in frequency ranges greater than the microwave region. In one embodiment, the photodetector is a high bandwidth photodiode. For example, the high bandwidth photodiode has a bandwidth of 50 GHz.

Figure 3:
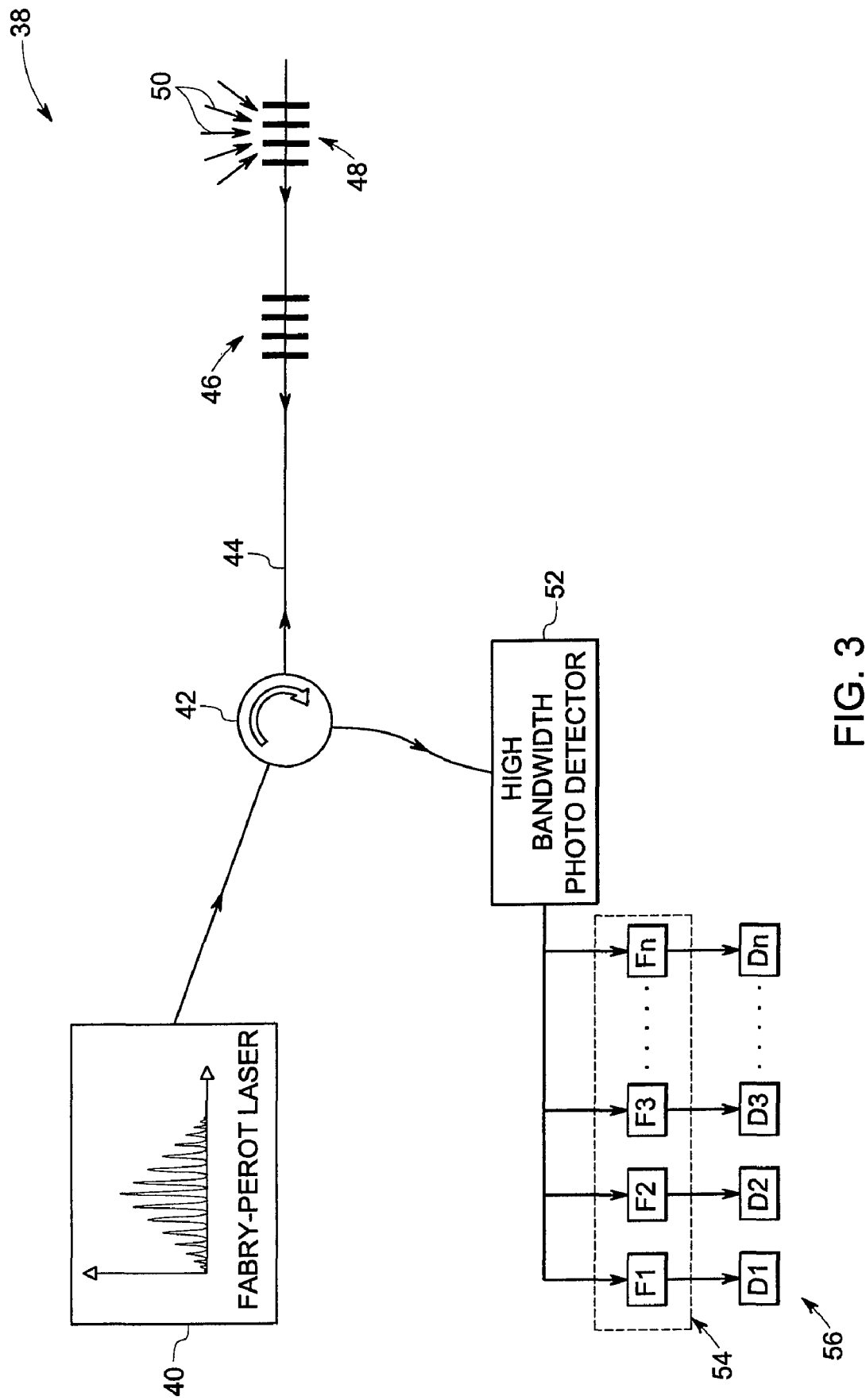
FIG. 3 is a schematic view of an optical interrogation system in accordance with another embodiment of the present invention.

FIG. 3 illustrates another embodiment of the present invention. In this embodiment, the optical interrogation system 38 includes a Fabry-Perot laser 40, which emits at a plurality of wavelengths. The spectral lines in the optical comb of wavelengths are spaced evenly as determined by the laser cavity length. Similar to the illustrated embodiment in FIG. 1, the light from the Fabry-Perot laser 38 is coupled through an optical circulator 42 to a fiber 44 through to an in-fiber reference sensor 46 (such as a bragg grating) and an in-fiber optical data sensor 48 (such as a bragg grating). A reference wavelength component $\omega_r$ and a data sensor wavelength component $\omega_o$ are reflected by the respective sensors and carried back along the same fiber 44 to the optical signal directing element such as an optical circulator 42, which separates the forward and backward propagating signals, and the combined reference and sensor data signal is coupled into a photodetector 52 to generate the difference current $I_d$. As the laser source 40 emits at discrete wavelengths separated by a known amount, the frequency of the electrical difference frequency signal can be measured through the use of a combination of a bank of narrow band filters and RF power detectors. The difference current $I_d$ is passed though a series of narrow band filters 54. The output of the filters 54 is measured by the RF power detectors 56 (such as diodes) to determine the frequency of the electrical difference frequency signal. For example, if the wavelength spacing in the comb of wavelengths is about 0.1 nm, then electrical frequency filters having a bandwidth of 1 or 2 GHz, with center frequencies spaced apart by about 12.5 GHz, can be used to filter the frequencies. Since the electrical frequencies are at pre-determined locations, the filter bandwidths can be very narrow offering noise rejection and high-speed detection.

Figure 4:
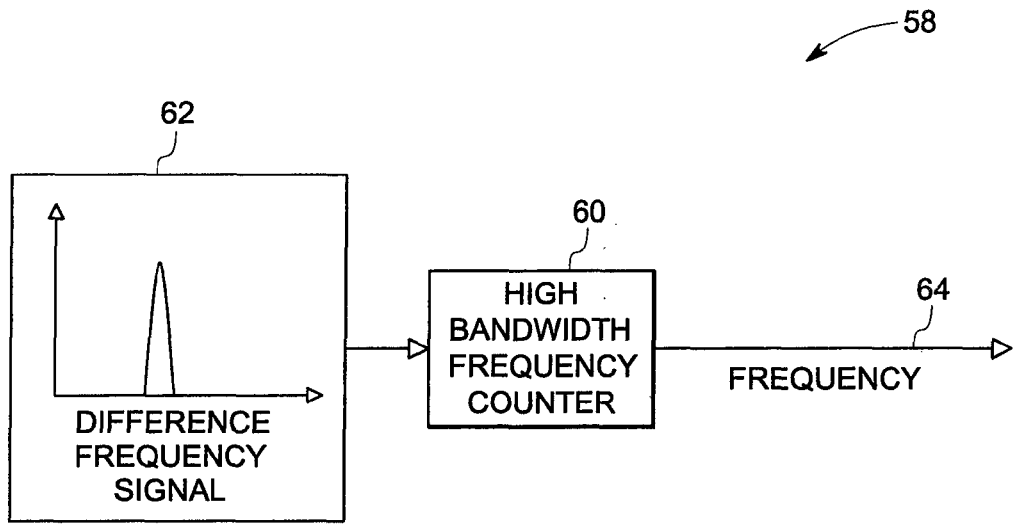
FIG. 4 is a schematic representation of an electrical frequency measurement module in one embodiment of the present invention.

In a further embodiment of the present invention, the frequency measurement module 58 includes a high bandwidth frequency counter 60 to determine the difference frequency as shown in FIG. 4. A non-limiting example of a high bandwidth frequency counter is a frequency counter with a range of 0 to about 50 GHz. Because of the high bandwidth, the frequency 64 of an input difference frequency signal 62 can be directly estimated by the frequency counter 60.

Figure 5:
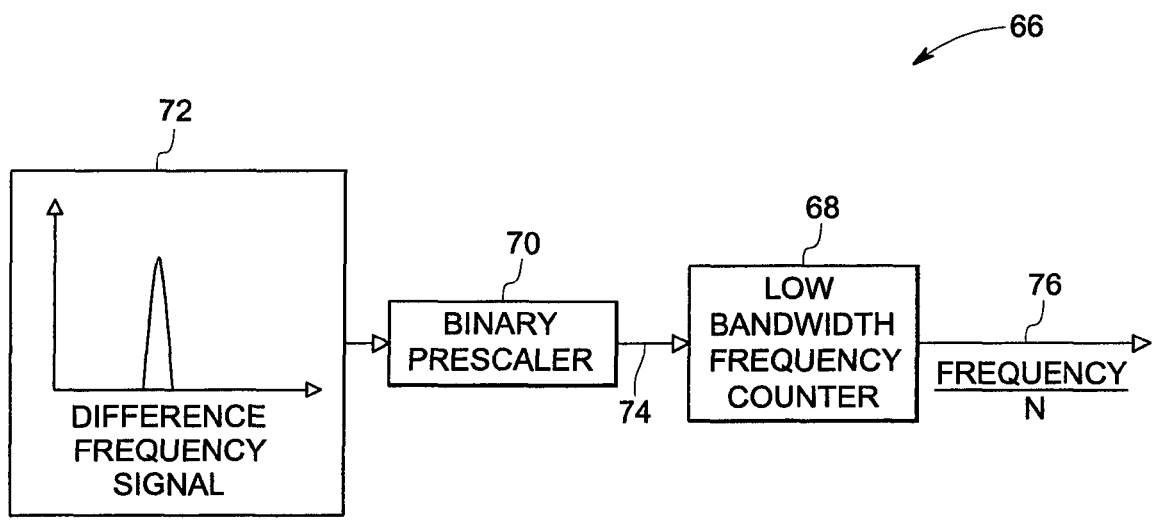
FIG. 5 is a schematic representation of an electrical frequency measurement module in another embodiment of the present invention.

In another embodiment of the present invention, a frequency measurement module 66 as shown in FIG. 5 includes a low bandwidth frequency counter 68 in conjunction with a binary prescaler 70. The binary prescaler reduces (divides by N) the overall frequency of the input signal 72 before the signal 74 is sent to the low frequency counter 68 for frequency measurement. The frequency value 76 output by the counter 68 is $(1/N)^{th}$ of the frequency of the input signal 72. For example, a 40 GHz signal input into a prescaler, which is configured to scale the frequency by a factor of 8, outputs a 5 GHz signal, which can be measured, for example, by a 0-10 GHz range frequency counter.

Figure 6:
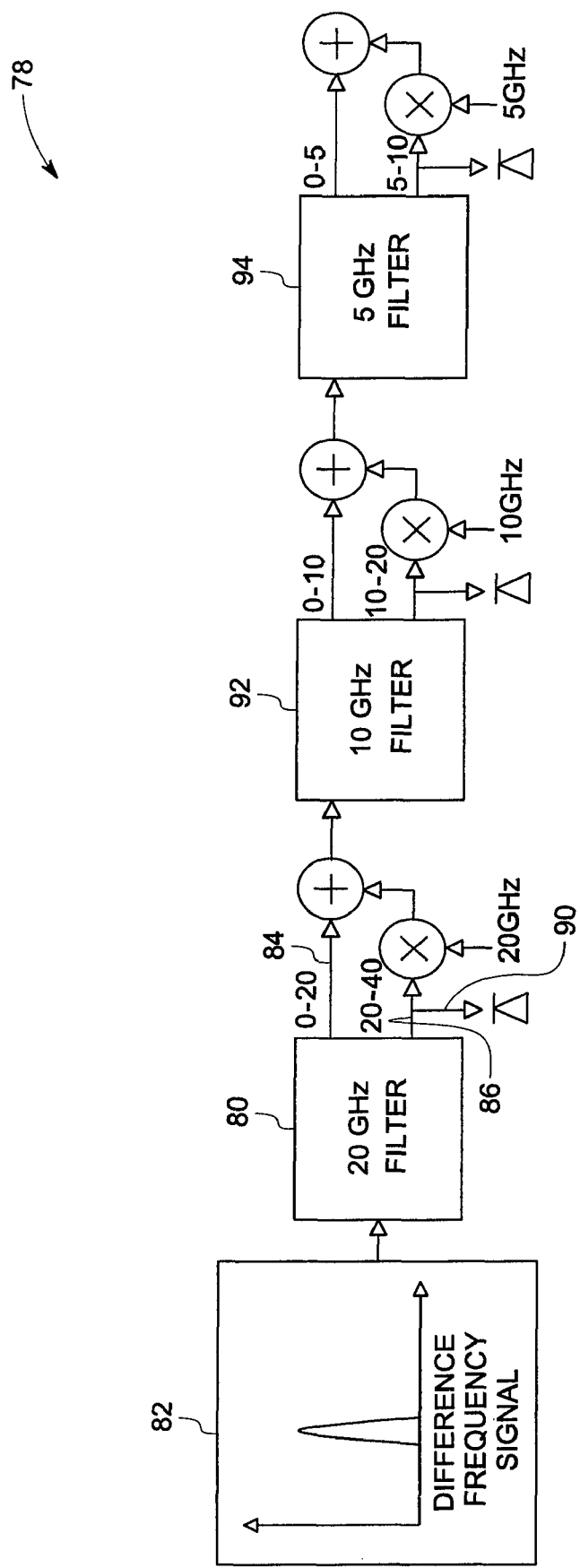
FIG. 6 is a schematic representation of an electrical frequency measurement module in another embodiment of the present invention.

In still another embodiment of the present invention is a frequency measurement module 78 (FIG. 6), which includes a filter 80 to separate the input frequency signal 82 into low band 84 or high band 86 frequency band paths. After the separation, the high band frequency signal is down-converted and recombined so that the energy covers half of the original bandwidth. A power tap 90 can be used before recombination to determine if the energy is in the high or low band. This sets the most significant bit of a digital word used to describe the frequency. For example, a 20 GHz filter filters a signal in the 0 to 20 GHz range along the low band output path and a signal in the 20 to 40 GHz frequency range through the high band path. If the signal is in the high band path 86, the signal is then down converted to be in the low band range, and then recombined into the low band output path 84. This signal is then passed through another similar stage including a 10 GHZ filter 92 to determine the 2nd digit of the digital output. This signal output of 10 GHz filter stage is then passed through another similar stage including a 5 GHZ filter 94 to determine the 2nd digit of the digital output. This is repeated in series until the desired accuracy is achieved.

Figure 7:
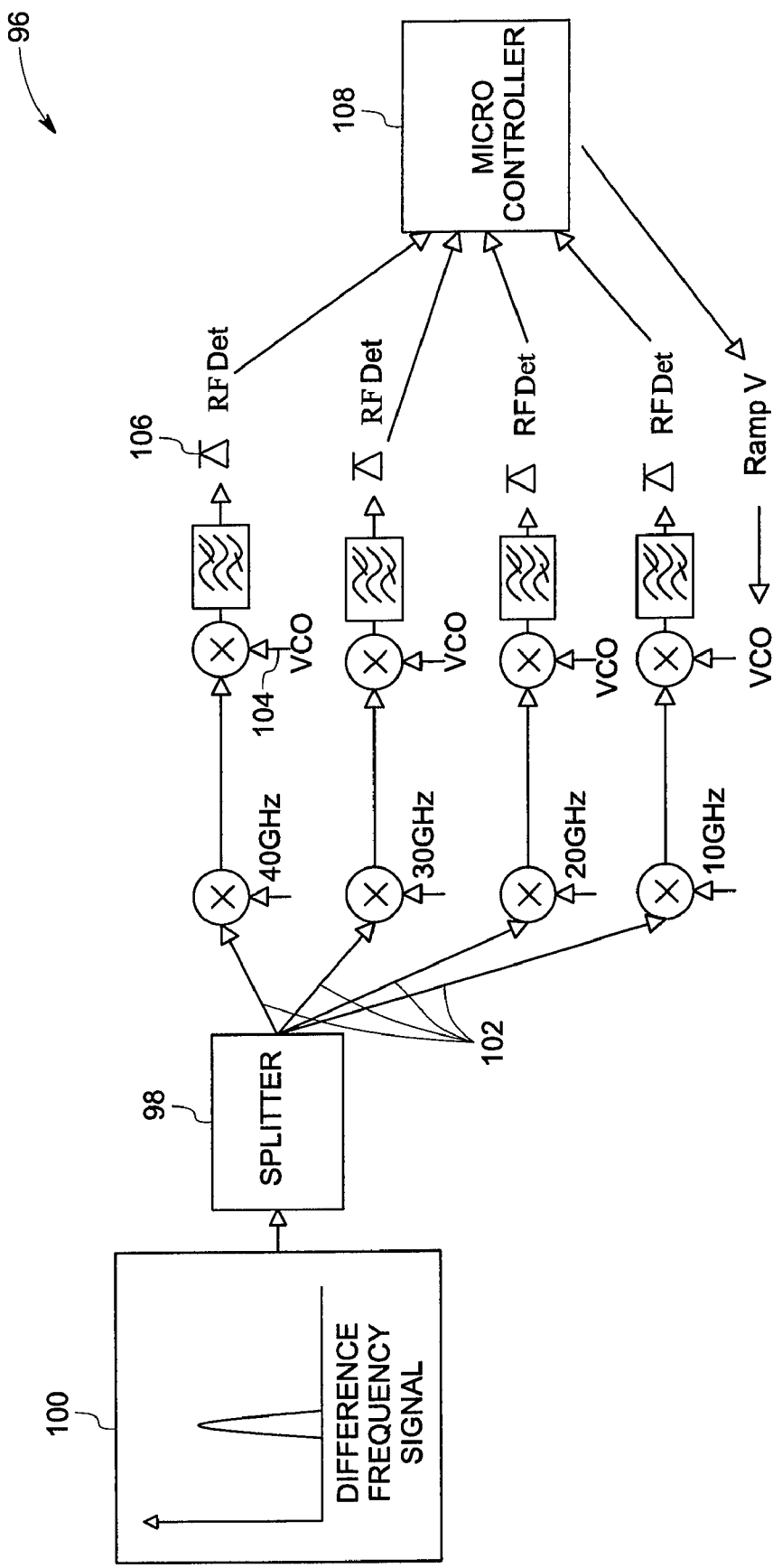
FIG. 7 is a schematic representation of an electrical frequency measurement module in another embodiment of the present invention.

FIG. 7 illustrates a frequency measurement module 96 in another embodiment of the present invention. In this embodiment, an electrical splitter 98 is used to down convert the input difference frequency signal 100 along different frequency bands 102 of the difference frequency and to get a course measurement of the frequency. For example, a splitter splits the input frequency into four different frequency bands, 40, 30, 20 and 10 GHz bands. Each of the split bands is input to a voltage controlled oscillator (VCO) 104. The voltage controlled oscillator 104 includes a varactor diode tuning element which acts as a capacitor. The voltage controlled oscillator 104 is tuned across its band by a ramp voltage applied to the varactor diode to vary the net capacitance. The output from the VCOs are measured using RF diodes 106. This enables fine measurement of the frequency of the input signal. A microcontroller 108 is used to both control the ramp to the oscillator and to measure the frequency.

Another embodiment of the present invention is a method for optical sensor interrogation. The method includes interrogating at least one optical sensor via a multi-frequency interrogation signal. The optical sensor is configured to filter light at a wavelength corresponding to value of a sensed parameter to generate an optical sensor data signal. A reference at a predetermined wavelength is also generated. In one embodiment, the reference signal is generated using a reference sensor by filtering a wavelength component of the interrogation signal to generate a stand reference signal. In a further embodiment, the reference sensor is immune or is isolated from the effects of any physical parameter, which can lead to a change in wavelength component filtered by the reference sensor. The reference signal and the optical sensor data signal are detected by a broadband photodetector. The photodetector generates an electrical difference frequency current signal corresponding to the wavelength difference between the reference signal and the optical sensor data signal. The frequency of the current signal is then measured. The method may further include estimating the wavelength filtered by the optical sensor from the measured electrical difference frequency. The method may still further include the estimating the value of the sensed parameter from the measured electrical difference frequency. In some embodiments using high bandwidth frequency counters. In other embodiments, the electrical difference frequency is measured using a prescaler in combination with a low frequency counter.

In some embodiments, the electrical difference frequency signal may be separated into different frequency bands, and then analyzed. In one embodiment, a series of filters and down converters are used to separate the various bands, down converted to lower frequencies and then measured. Alternatively, if a Fabry-Perot or external cavity laser source is used, a series of narrow band filters in combination with power diodes can be used to measure the frequency. In another embodiment, electrical frequency measurement comprises using a splitter in combination with voltage control oscillators and a microcontroller. Embodiments of the present invention can be used to measure parameters such as but not limited to magnetic field, electric field, current, voltage, stress, strain, pressure, and temperature.

Although the above described embodiments illustrate the use of a single optical data sensor, the present invention also includes embodiments of optical interrogation systems and methods which use a plurality of optical data sensors to concurrently or sequentially measure various parameters. For example, current at several locations along a transmission line could be concurrently measured using a plurality of optical data sensors located on a single fiber running along a transmission line.

EXAMPLE

Figure 8:
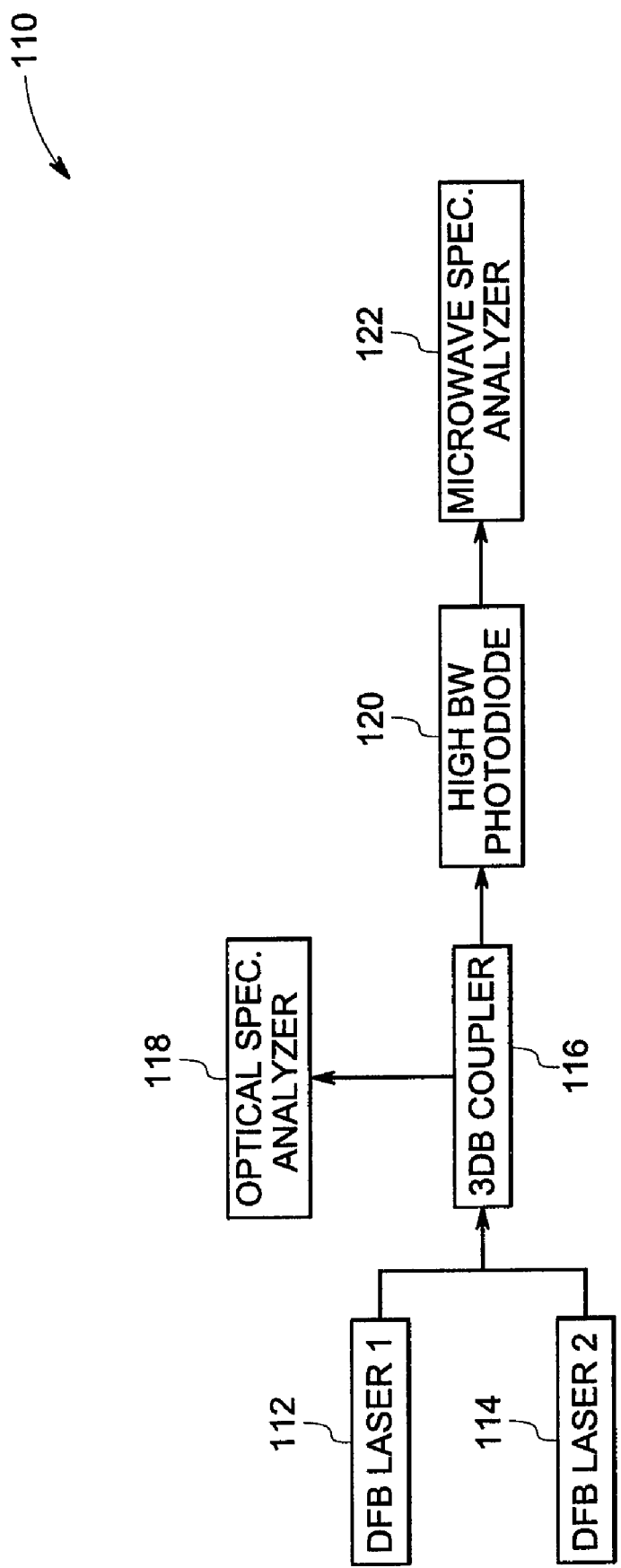
FIG. 8 is a schematic representation of a test device illustrating the mixing of two optical test signals and the difference frequency measurement between the signals in one embodiment of the present invention.

A test device 110 (FIG. 8) was built to test the difference frequency measurement scheme in one embodiment of the present invention. The output signals from two distributed feedback laser sources, 112 and 114 with center frequencies 1551 nm and 1550.5 nm respectively, were used to simulate narrowly separated optical signals. These were combined using a 3 DB coupler 116. A first part of the combined signal was input to an optical spectrum analyzer 118 and a second part fed into a photodiode 120. The resulting photodetector current from the photodiode was input into a microwave spectrum analyzer 122. Two optical peaks were observed using the optical spectrum analyzer 118.

Figure 9:
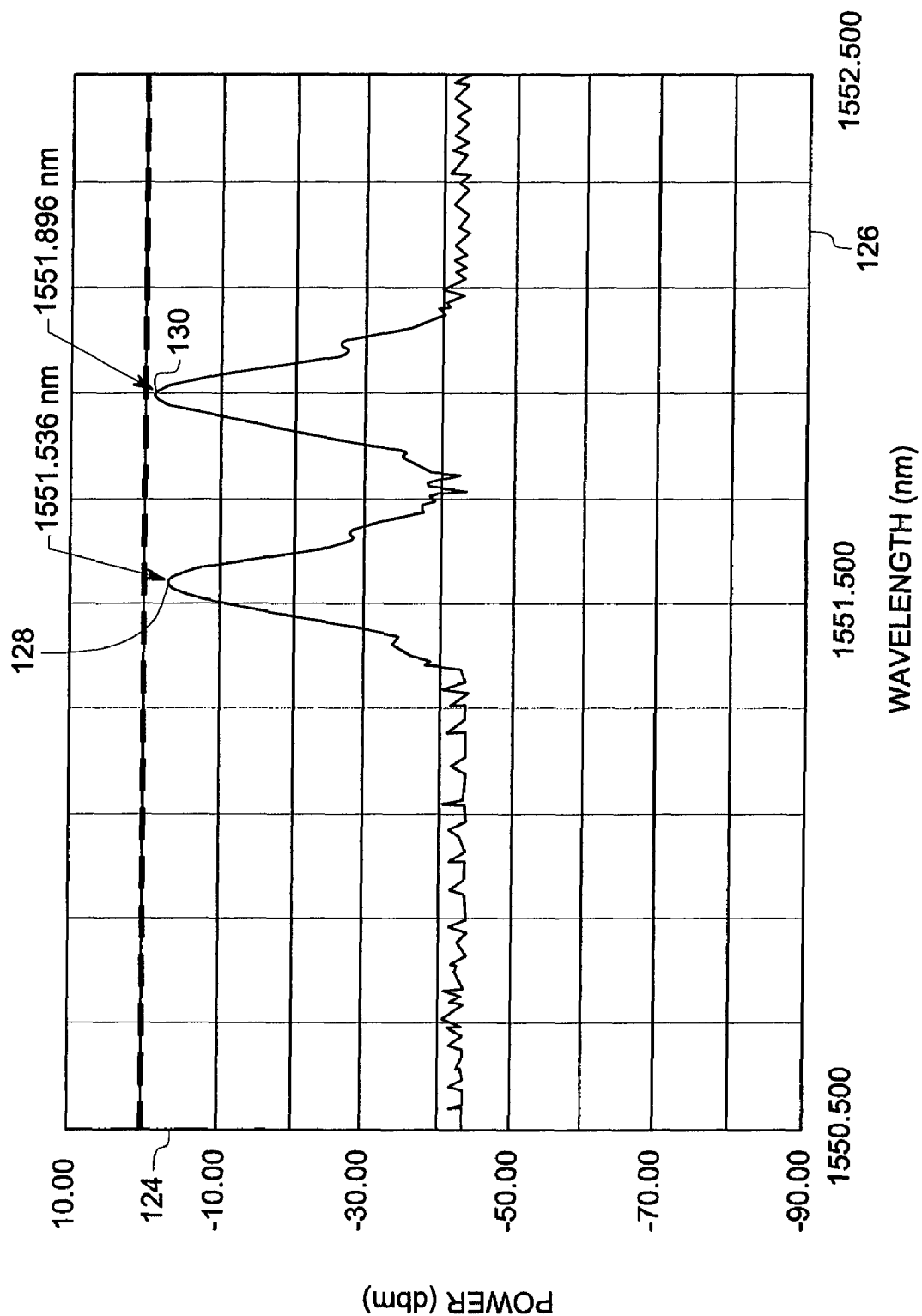
FIG. 9 is a graphical representation of intensity versus wavelength of two optical test signals measured by an optical spectrum analyzer in one embodiment of the present invention.
Figure 10:
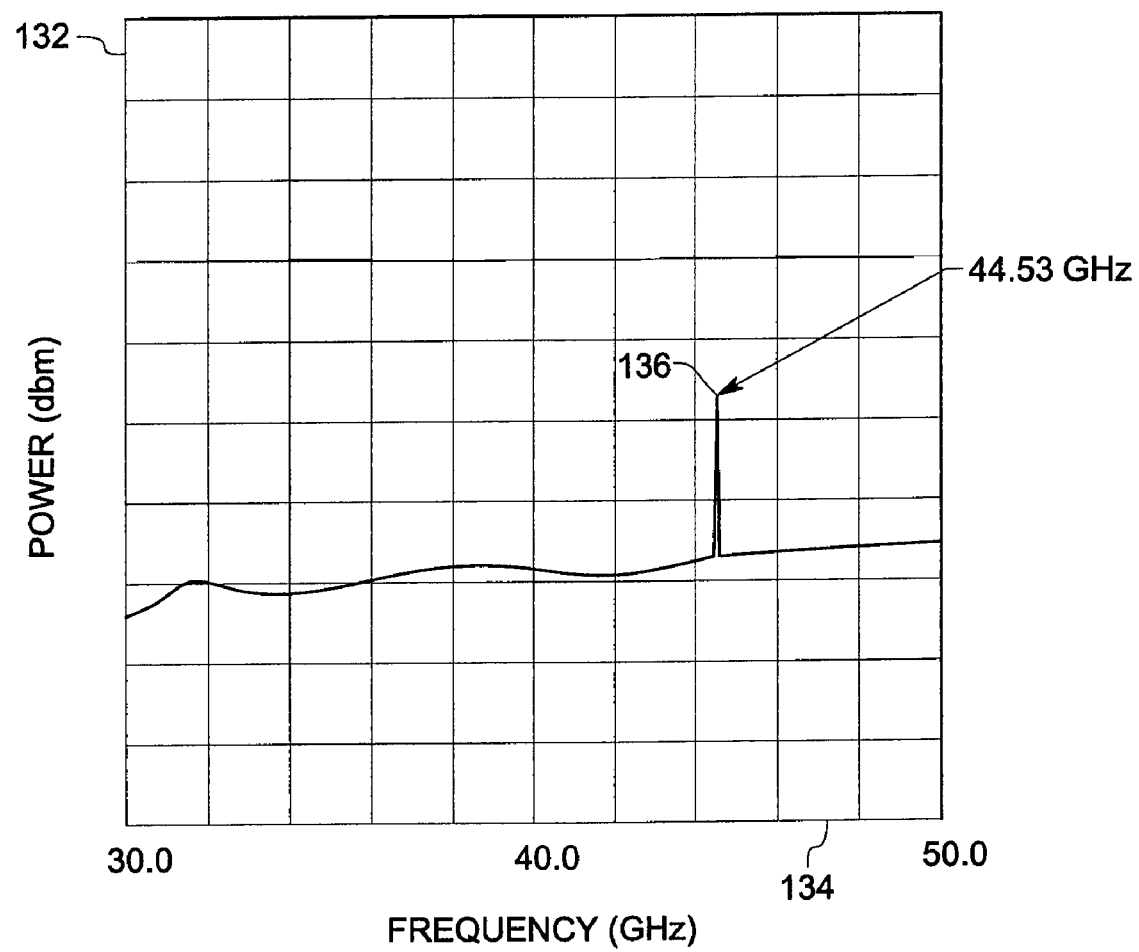
FIG. 10 is a graphical representation of intensity versus electrical difference frequency measured by a microwave spectrum analyzer in one embodiment of the present invention.

FIG. 9. illustrates the optical power 124 versus wavelength 126 profile observed by the optical spectrum analyzer of the two optical peaks 128 and 130. The difference electrical frequency peak was observed on a microwave spectrum analyzer. FIG. 10. illustrates the microwave power 132 versus frequency 134 profile observed by the microwave spectrum analyzer of the difference frequency peak 136. The frequency of the laser 114 was temperature tuned in steps of 0.1 nm and the corresponding difference frequency was both calculated (Table 1) and measured using the microwave spectrum analyzer 122. The measured and calculated difference frequencies were plotted against the wavelength difference between the two optical peaks as shown.

Figure 11:
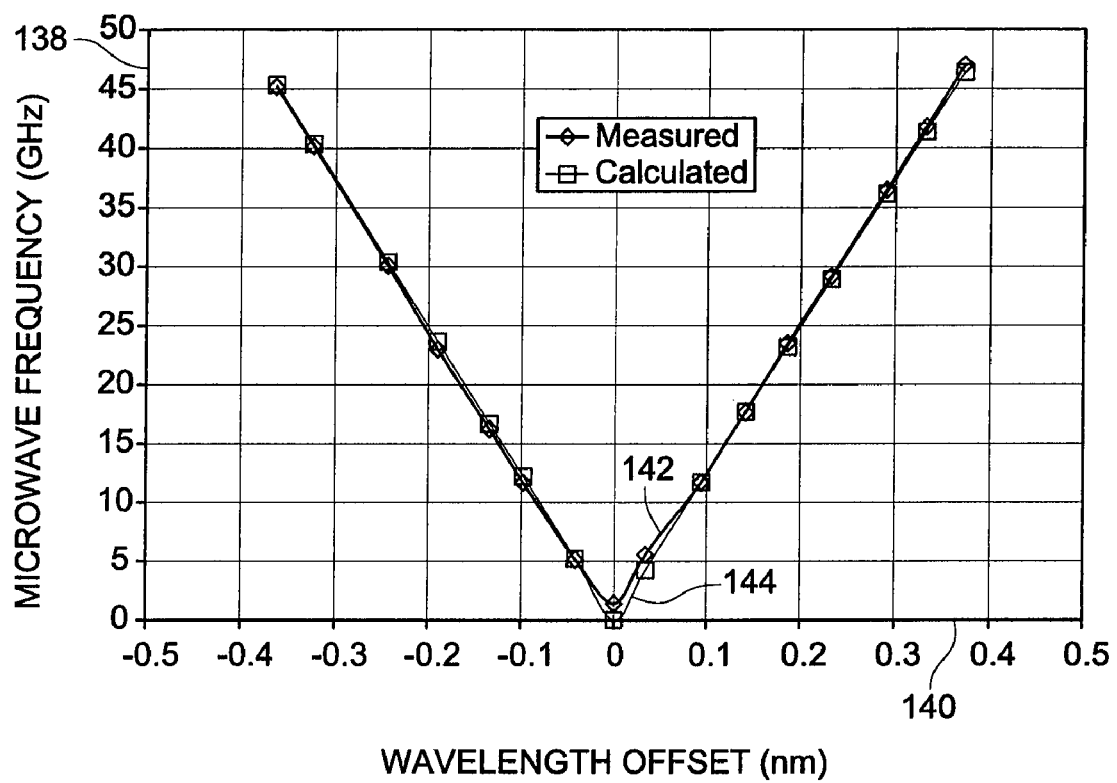
FIG. 11 is a graphical representation of calculated and measured difference frequency versus wavelength difference for two optical test signals in one embodiment of the present invention.

FIG. 11 is the frequency 138 versus wavelength offset 140 plot profiles for measured difference frequency 142 and calculated difference frequency 144. As can be seen from FIG. 11, the calculated and measured difference frequencies overlap validating the difference frequency measurement scheme.

TABLE 1

| Calculated difference frequency | | | | |
|---|---|---|---|---|
| Reference wavelength (nm) | Sensor data wavelength 2 (nm) | Reference frequency (GHz) | Sensor data frequency (GHz) | Difference frequency (GHz) |
| 1551.0 | 1550.5 | 193,424 | 193,486 | 62.4 |
| 1551.0 | 1550.6 | 193,424 | 193,473 | 49.9 |
| 1551.0 | 1550.7 | 193,424 | 193,461 | 37.4 |
| 1551.0 | 1550.8 | 193,424 | 193,449 | 24.9 |
| 1551.0 | 1550.9 | 193,424 | 193,436 | 12.5 |
| 1551.0 | 1551.0 | 193,424 | 193,424 | 0.0 |
| 1551.0 | 1551.1 | 193,424 | 193,411 | 12.5 |
| 1551.0 | 1551.2 | 193,424 | 193,399 | 24.9 |
| 1551.0 | 1551.3 | 193,424 | 193,386 | 37.4 |
| 1551.0 | 1551.4 | 193,424 | 193,374 | 49.9 |
| 1551.0 | 1551.5 | 193,424 | 193,361 | 62.3 |

The optical sensor interrogation system and method described herein have the advantage of direct conversion of optical difference signal to an electrical signal without the complexity and expense of using instrumentation such as optical spectrum analyzers. Further, as the optical sensor data signal is converted and processed entirely in the electrical domain, the frequency determination may be achieved at faster rates than in conventional optical interrogation systems. Additionally, all the elements of the frequency measurement module may be advantageously integrated into a thin film or flexible microwave packaging.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical sensor-interrogation system comprising:
    a multi-frequency optical source configured to generate an optical interrogation signal;
    at least one optical sensor configured to filter light at a wavelength corresponding to a value of a sensed parameter and generate an optical sensor data signal;
    a photodetector configured to detect a reference signal and the optical sensor data signal and generate an electrical difference frequency signal corresponding to a wavelength difference between the reference signal and the optical sensor data signal; and
    an electrical frequency measurement module configured to measure the electrical difference frequency.

2. The optical sensor-interrogation system of claim 1, further comprising a reference sensor configured to generate the reference signal from the optical interrogation signal.

3. The optical sensor-interrogation system of claim 2, wherein the optical sensor and the reference sensor comprise fiber Bragg gratings on a single fiber.

4. The optical sensor-interrogation system of claim 1, wherein the optical sensor comprises a fiber Bragg grating.

5. The optical sensor-interrogation system of claim 1, wherein the optical sensor comprises at least one sensor selected from the group consisting of fiber Fabry Perot cavities, optical microresonators, thin film filters, acousto-optic filters and combinations thereof.

6. The optical sensor-interrogation system of claim 1, further comprising an optical signal directing element configured to direct the interrogation signal to the at least one optical sensor and direct the generated optical data signal to the photodetector.

7. The optical sensor-interrogation system of claim 6, wherein the signal directing element comprises an optical circulator or a directional coupler.

8. The optical sensor-interrogation system of claim 1, wherein the multifrequency source comprises a broadband source, a Fabry Perot laser or an external cavity laser.

9. The optical sensor-interrogation system of claim 1, wherein the frequency measurement module comprises frequency counters, frequency discriminators, binary prescalers, passive filters, combiners, power taps, voltage control oscillators, electrical splitters, RF power diodes, microcontrollers, or any combination thereof.

10. The optical sensor-interrogation system of claim 1, wherein the sensed parameter comprises magnetic field, electric current, electric field, stress, strain, pressure, or temperature, or any combination thereof.

11. An optical sensor-interrogation system comprising:
a laser source configured to generate an optical interrogation signal;
at least one optical sensor configured to filter light at a wavelength corresponding to a value of a sensed parameter and generate an optical sensor data signal;
at least one reference sensor configured to filter light at a wavelength corresponding to a value of a reference parameter and generate a reference signal;
a photodetector configured to detect the reference signal and the optical sensor data signal and generate an electrical difference frequency signal corresponding to a wavelength difference between the reference signal and the optical sensor data signal; and
an electrical frequency measurement module configured to measure the electrical difference frequency, wherein the electrical frequency measurement module comprises a series of narrow band filters.

12. The optical sensor-interrogation system of claim 11, wherein the optical interrogation signal comprises signal having a plurality of wavelengths.

13. The optical sensor-interrogation system of claim 11, wherein the laser source comprises a Fabry Perot laser or an external cavity laser.

14. The optical sensor-interrogation system of claim 11, wherein the optical sensor comprises at least one sensor selected from the group consisting of fiber Fabry Perot cavities, optical microresonators, thin film filters, acousto-optic tunable filters and combinations thereof.

15. The optical sensor-interrogation system of claim 11, wherein the electrical frequency module further comprises RF diodes, and wherein the narrow band filter outputs are coupled to the RF diodes.

16. A method for optical sensor interrogation and measurement comprising:
interrogating at least one optical sensor via a multi-frequency optical interrogation signal, the at least one optical sensor configured to filter light at a wavelength corresponding to value of a sensed parameter to generate an optical sensor data signal;
detecting a reference signal and the optical sensor data signal via a single broadband photodetector, the photodetector generating an electrical difference frequency signal corresponding to the wavelength difference between the reference signal and the optical sensor data signal; and
measuring electrical frequency of the difference frequency signal.

17. The method of claim 16, further comprising generating the reference signal from the interrogation signal by filtering at the reference signal wavelength.

18. The method of claim 16, further comprising estimating an optical sensor wavelength of the at least one sensor data signal from the electrical difference frequency.

19. The method of claim 16, further comprising estimating the value of the sensed parameter from the electrical difference frequency.

20. The method of claim 16, wherein measuring the electrical frequency comprises using a high bandwidth frequency counter.

21. The method of claim 16, wherein measuring the electrical frequency comprises using a prescaler in combination with a low frequency counter, wherein the prescaler downshifts the frequency of the difference frequency signal.

22. The method of claim 16, wherein measuring the electrical frequency comprises using a series of filters and down converters.

23. The method of claim 16, wherein the multi-frequency optical interrogation signal comprises light output from a broadband source, a Fabry-Perot or an external cavity laser.

24. The method of claim 16, wherein the multi-frequency optical interrogation signal comprises spectral lines at equally spaced wavelengths.

25. The method of claim 24, wherein measuring the electrical frequency comprises using a series of narrow band filters.

26. The method of claim 16, wherein measuring the electrical frequency comprises using a splitter in combination with a voltage control oscillator and a microcontroller.

27. The method of claim 16, wherein the sensed parameter comprises magnetic field, electric field, current, voltage, stress, strain, pressure, or temperature, or any combination thereof.

* * * * *